June 26, 1951  W. A. RAY  2,558,387
LIQUID SAMPLER
Filed Jan. 28, 1946
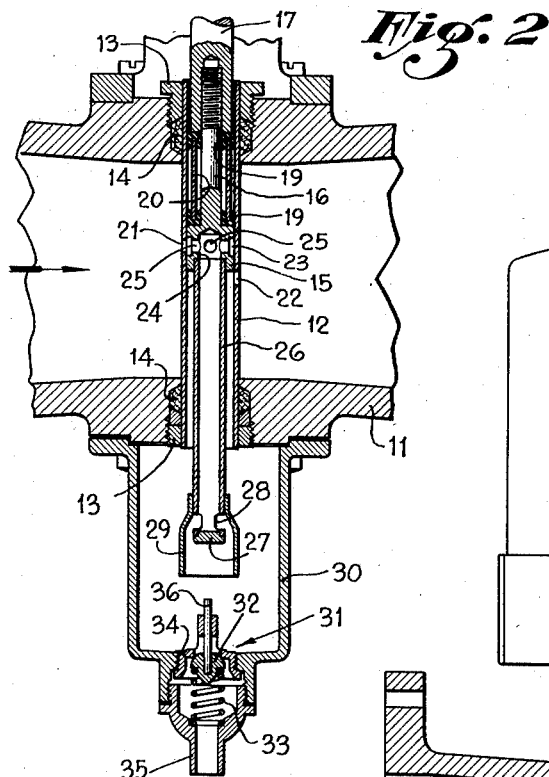
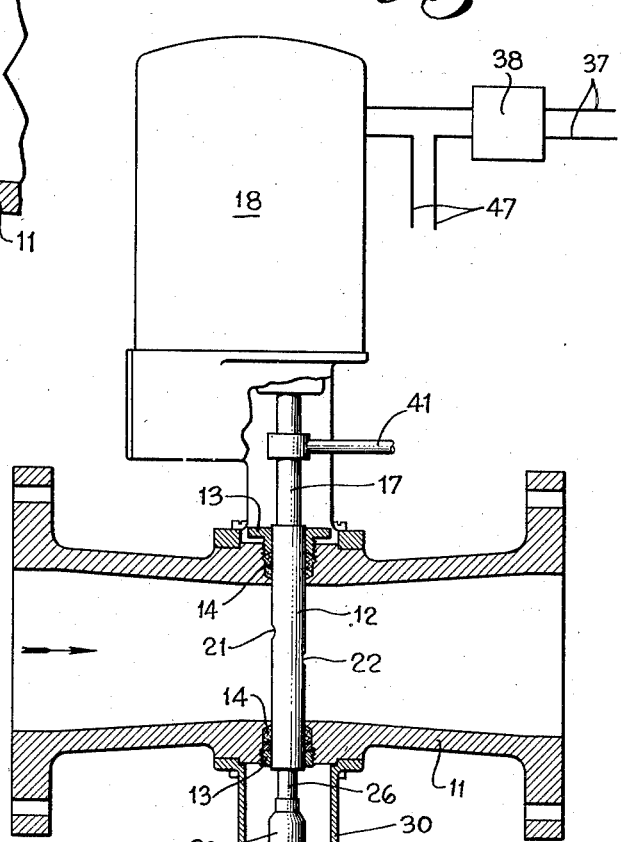
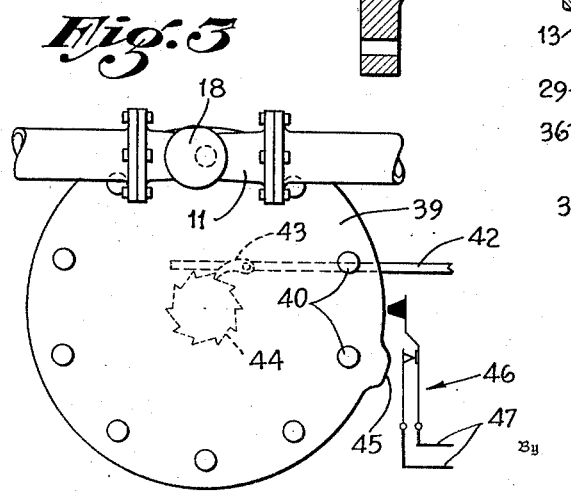
Inventor:
WILLIAM A. RAY,
John H. Rouse,
Attorney.

Patented June 26, 1951

2,558,387

UNITED STATES PATENT OFFICE 2,558,387

LIQUID SAMPLER

William A. Ray, North Hollywood, Calif., assignor to General Controls Co., Glendale, Calif., a corporation of California Application January 28, 1946, Serial No. 643,944

3 Claims. (Cl. 73—422)

My present invention relates to a system for periodically removing samples of liquid flowing through a line or conduit, and has for a general object the provision of means forming a compartment or chamber through which the liquid normally circulates, and means for interrupting the circulation through the chamber and discharging a sample therefrom.

Another object is to provide means whereby the liquid is so uniformly distributed throughout the chamber that the sample is well representative of the liquid in the conduit at the time the sample is taken.

Another object is to provide a relatively large sample-chamber and means for segregating a measured portion of its contents for discharge as a sample.

For full understanding of the invention, and further appreciation of its objects and advantages, reference is to be had to the following detailed description and accompanying drawing, and to the appended claims.

In the drawing:

Figure 1 is a side elevation, partly in section, of apparatus embodying the invention;

Figure 2 is an enlarged, fragmentary, sectional view of the sampling means shown in elevation in Fig. 1; and Figure 3 is a plan of the apparatus of Fig. 1 and shows, in addition, a turntable for carrying sample-receptacles.

In the drawing, the numeral 11 indicates a conduit member adapted to form part of a line for conveying the liquid of which samples are to be taken. Mounted in diametrically-opposite vertical openings through the conduit member is a hollow cylinder 12 of small diameter with respect to the bore of the conduit; glands 13 and packing 14 being provided at each end of the cylinder for sealing the openings. Slidably fitting within the cylinder is a plunger 15, the reduced upper portion 16 of which is threaded for connection to the stem 17 of a motor, generally indicated at 18, mounted on the conduit member. This motor can be of any convenient type operated by fluid pressure or electricity and controllable, preferably electrically, to effect selective reciprocation of the stem 17. Above the plunger 15 in cylinder 12 is a slidable seal comprising a pair of annular packing members 19 which are spaced apart by a tube 20 and compressed between the top of the plunger and the bottom edge of stem 17.

The cylinder 12 is provided with an inlet passage 21 (facing the flow-direction arrow) and an outlet passage 22. Formed in the plunger 15 is a circumferential recess 23 which registers with the inlet passage 21 when the plunger is in its normal position, as shown. Joining the recess 23 to a cavity 24 bored centrally in the bottom of the plunger is a plurality (four, as illustrated) of openings 25. Fitting tightly in an outer enlargement of the cavity 24 is a tubular member 26 which forms an extension of the plunger. This member is provided at its bottom with a plug 27, there being openings 28 above the plug for passage of fluid. Secured to the member 26, above the openings 28, is an inverted cup-like member 29. Secured to the underside of the conduit member 11, and encompassing the open bottom-end of cylinder 12, is a cup-shaped housing 30 into which the plunger-tube 26 extends. Normally closing an opening through a thickened central portion of the bottom wall of the housing is a valve 31 comprising a closure 32 which is biased upwardly by a compression spring 33 into seating engagement with a bushing 34; the bottom end of the spring being supported by a nozzle 35 provided at the outer end of the valve opening. The closure 32 has an upwardly-projecting stem 36 engageable by the plug 27 in the downward movement of the plunger.

Connected in circuit with the motor 18 and electrical supply lines 37 is an automatic timer 38 which is adapted to effect periodic energization and deenergization of the motor so that the plunger is moved gradually downwardly, to a position wherein the mouth of cup 29 is in engagement with the bottom wall of housing 30, and then retracted; the plunger being maintained for a brief interval in its depressed position.

As is shown in Fig. 3, a turntable 39 may be provided for carrying a series of sample-receptacles 40; the turntable being driven by the motor-stem 17 through shafts 41 and 42 (Figs. 1 and 3, respectively) interconnected by conventional means (not shown), ratchet 43, and ratchet-wheel 44. In order to stop operation of the sampling system when all of the receptacles 40 have been filled, the turntable is provided with a cam 45 which acts to open a normally-closed switch 46 connected by wires 47 (Figs. 1 and 3) in series with the timer 38 and the motor; it then being necessary to move the turntable manually to reclose the switch and thereby start the next cycle of operations.

When the parts are in the positions shown in the drawing, part of the liquid flowing in the conduit member enters the cylinder-passage 21 and passes by way of the plunger-recess 23 and openings 25 through the tube 26 and openings 28 into the interior of housing 30; the liquid thence flowing upwardly between the tube 26 and cylinder 12 to the outlet passage 22. When, upon energization of the motor, the plunger is moved downwardly, it closes the inlet and outlet passages 21—22 and, toward the end of its stroke when the plug 27 reaches the valve-stem 36, effects opening of the valve 31 so that liquid flows by gravity into the receptacle 40; the cup member 29 being in engagement with the bottom wall of housing 30 when the plunger is in its final position so that the amount of liquid discharged as a sample is limited to that then trapped within the tube 26 and cup 29. The fit of the plunger within the cylinder is such that liquid under pressure can pass around it to the passages 21—22 in the downward and upward movements of the plunger; and, further, it will be observed that the plunger-recess 23 is in communication with the outlet passage 22 during part of the plunger-stroke.

The specific embodiment of my invention herein shown and described is obviously susceptible of modification without departing from the spirit of the invention, and I intend therefore to be limited only by the scope of the appended claims.

I claim as my invention:

1. In a system for removing samples of liquid flowing through a conduit: means forming a chamber having a vertical cylindrical part; an elongated plunger member slidably fitting said cylindrical part and extending downwardly within said chamber, said plunger member being hollow and having an opening normally in register with an opening in said cylindrical part; means forming an inlet passage communicating with said cylindrical-part opening and an outlet passage for the chamber, whereby said liquid can normally circulate through the chamber by way of the hollow of said plunger member; said plunger member being movable out of register with said cylindrical-part opening and into engagement with the bottom wall of the chamber so as to trap the liquid within the plunger member; and normally-closed valve means in said bottom wall of the chamber and operated by the plunger member to discharge by gravity the liquid trapped therein.

2. In a system for removing samples of liquid flowing through a closed conduit: a hollow cylinder sealingly mounted in diametrically-opposite openings through the wall of said conduit and exposed to said liquid; a plunger slidably fitting said cylinder and closing one end thereof; means, including normally-closed valve means, closing the opposite end of the cylinder; said cylinder having an inlet and an outlet passage; said plunger having a reduced portion extending adjacent said opposite end of the cylinder and operatively engageable with said valve means; there being an opening in said plunger normally in register with said inlet passage and extending through said reduced portion; said outlet passage being so positioned that it is normally unobstructed by the plunger so that the liquid can circulate throughout the cylinder; and means for moving the plunger so as to close the first and second passages and then open said valve means.

3. In a system for removing samples of liquid flowing through a closed conduit: a hollow cylinder sealing mounted in diametrically-opposite vertical openings through the wall of said conduit and exposed to said liquid, a plunger slidably fitting said cylinder and closing the upper end thereof, a housing mounted on the underside of the conduit so as to cover the bottom opening therethrough, said plunger having a reduced portion extending downwardly adjacent the bottom wall of said housing, valve means normally closing a liquid-discharge opening through said bottom wall and operable by said extended portion of the plunger, said cylinder having an inlet and an outlet passage, there being an opening in the slidable portion of the plunger normally in register with said inlet passage and leading through said extended portion to the interior of the housing, said outlet passage being located below the slidable portion of the plunger when the same is in normal position, and means for moving the plunger downwardly so as to close the first and second passages and then open said valve means.

WILLIAM A. RAY.

REFERENCES CITED

The following references are of record in the file of this patent:

UNITED STATES PATENTS

| Number | Name | Date |
| --- | --- | --- |
| 1,837,858 | Grace | Dec. 22, 1931 |
| 1,852,445 | Calkins et al. | Apr. 5, 1932 |
| 2,012,836 | Talbot et al. | Aug. 27, 1935 |
| 2,370,260 | Robison | Feb. 27, 1945 |